(12) United States Patent
Byun et al.

(10) Patent No.: US 10,673,078 B2
(45) Date of Patent: Jun. 2, 2020

(54) BIPOLAR PLATE AND REDOX FLOW CELL COMPRISING SAME

(71) Applicant: LG CHEM, LTD., Seoul (KR)

(72) Inventors: Sujin Byun, Daejeon (KR); Tae Geun Noh, Daejeon (KR); Jeongbae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/773,241

(22) PCT Filed: Mar. 21, 2017

(86) PCT No.: PCT/KR2017/002987
§ 371 (c)(1),
(2) Date: May 3, 2018

(87) PCT Pub. No.: WO2017/171289
PCT Pub. Date: Oct. 5, 2017

(65) Prior Publication Data
US 2018/0331373 A1 Nov. 15, 2018

(30) Foreign Application Priority Data

Mar. 31, 2016 (KR) .................. 10-2016-0038848
Mar. 15, 2017 (KR) .................. 10-2017-0032353

(51) Int. Cl.
*H01M 8/0258* (2016.01)
*H01M 8/0234* (2016.01)
(Continued)

(52) U.S. Cl.
CPC .......... *H01M 8/0258* (2013.01); *H01M 4/94* (2013.01); *H01M 4/96* (2013.01); *H01M 8/0202* (2013.01);
(Continued)

(58) Field of Classification Search
None
See application file for complete search history.

(56) References Cited

U.S. PATENT DOCUMENTS 6,555,267 B1 4/2003 Broman et al.
9,166,243 B2 10/2015 Perry
(Continued)

FOREIGN PATENT DOCUMENTS

EP    2 395 584 A1   12/2011
JP    2002-184424 A   6/2002
(Continued)

OTHER PUBLICATIONS

International Search Report for PCT/KR2017/002987 dated Jun. 30, 2017.

*Primary Examiner* — Carmen V Lyles-Irving
(74) *Attorney, Agent, or Firm* — Birch, Stewart, Kolasch & Birch, LLP

(57) ABSTRACT

The present invention relates to a bipolar plate with fibrous conductive materials inserted into the flow path and a redox flow battery including the bipolar plate.

It is possible to realize the redox flow battery having an excellent energy efficiency while improving the charging/discharging capacity and efficiency regardless of the flow rate of the electrolyte solution, by increasing the retention time of the electrolyte solution in the flow path by the fibrous conductive materials to increase the chance of reaction with the electrode layer.

8 Claims, 8 Drawing Sheets

(51) Int. Cl.
   *H01M 4/94*   (2006.01)
   *H01M 8/04276* (2016.01)
   *H01M 4/96*   (2006.01)
   *H01M 8/18*   (2006.01)
   *H01M 8/0202* (2016.01)

(52) U.S. Cl.
   CPC ..... *H01M 8/0234* (2013.01); *H01M 8/04276* (2013.01); *H01M 8/188* (2013.01); *Y02E 60/528* (2013.01)

(56) References Cited

U.S. PATENT DOCUMENTS

| | | |
|---|---|---|
| 2012/0244395 A1 | 9/2012 | Perry |
| 2013/0095361 A1 | 4/2013 | Sinsabaugh et al. |
| 2014/0065460 A1 | 3/2014 | Evans et al. |
| 2015/0221959 A1 | 8/2015 | Jin et al. |
| 2017/0012299 A1* | 1/2017 | Itou ................ H01M 8/188 |
| 2017/0047594 A1 | 2/2017 | Hanafusa et al. |
| 2017/0162881 A1* | 6/2017 | Dong ............... H01M 8/0245 |

FOREIGN PATENT DOCUMENTS

| | | |
|---|---|---|
| JP | 2015-210849 A | 11/2015 |
| KR | 10-2001-0106463 A | 11/2001 |
| KR | 10-2007-0036501 A | 4/2007 |
| KR | 10-2007-0093734 A | 9/2007 |
| KR | 10-2010-0051257 A | 5/2010 |
| KR | 10-2010-0119230 A | 11/2010 |
| KR | 10-1176575 B1 | 8/2012 |
| KR | 10-1309262 B1 | 9/2013 |
| KR | 10-2014-0010713 A | 1/2014 |
| KR | 10-1359704 B1 | 2/2014 |
| KR | 10-2014-0099871 A | 8/2014 |
| KR | 10-2015-0002365 A | 1/2015 |
| KR | 10-2015-0020884 A | 2/2015 |
| KR | 10-2015-0049400 A | 5/2015 |
| KR | 10-2015-0055154 A | 5/2015 |

* cited by examiner

【Figure 1】
PRIOR ART
【Figure 2】
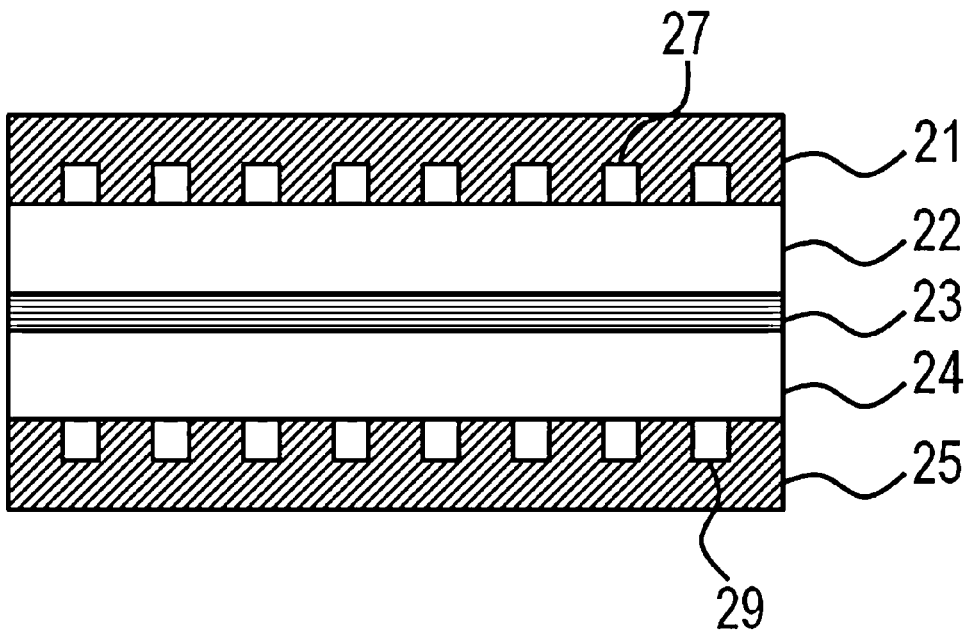

【Figure 3】
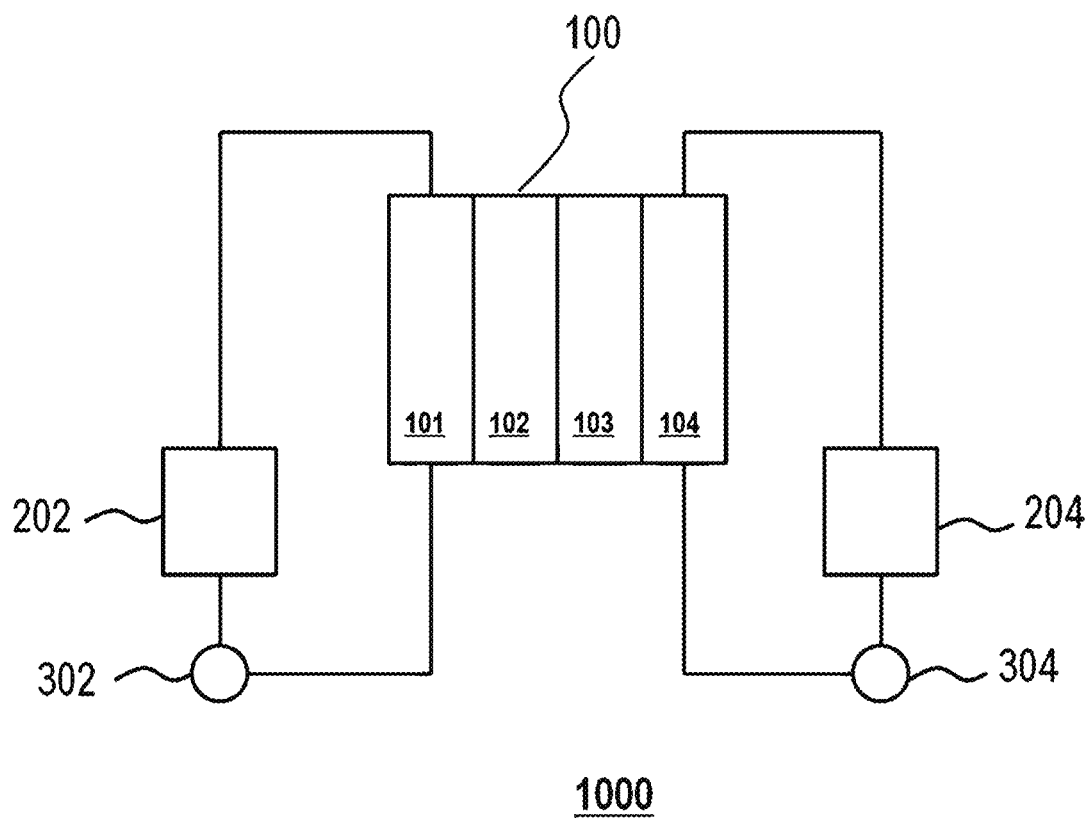

【Figure 4】
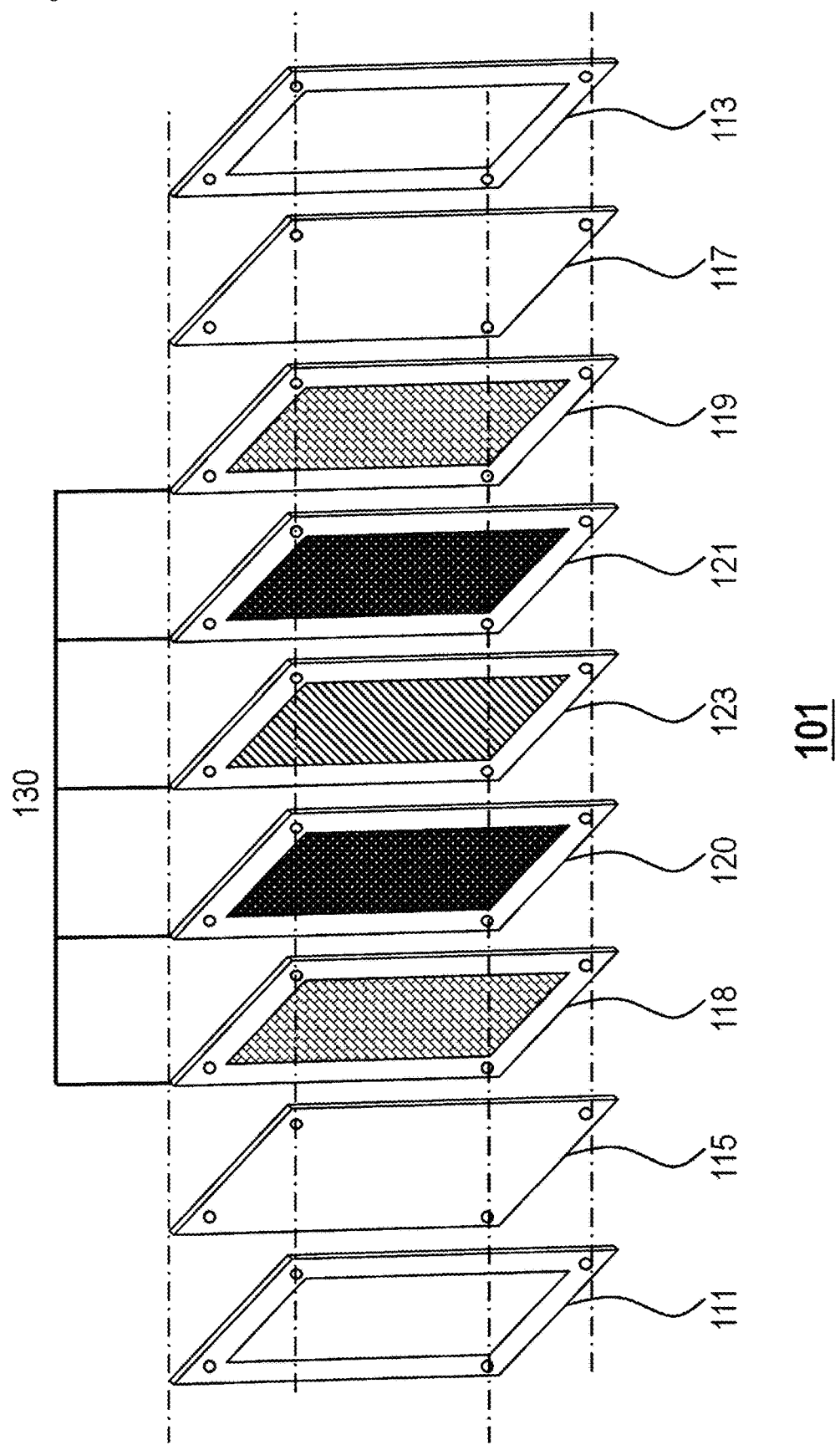

[Figure 5]
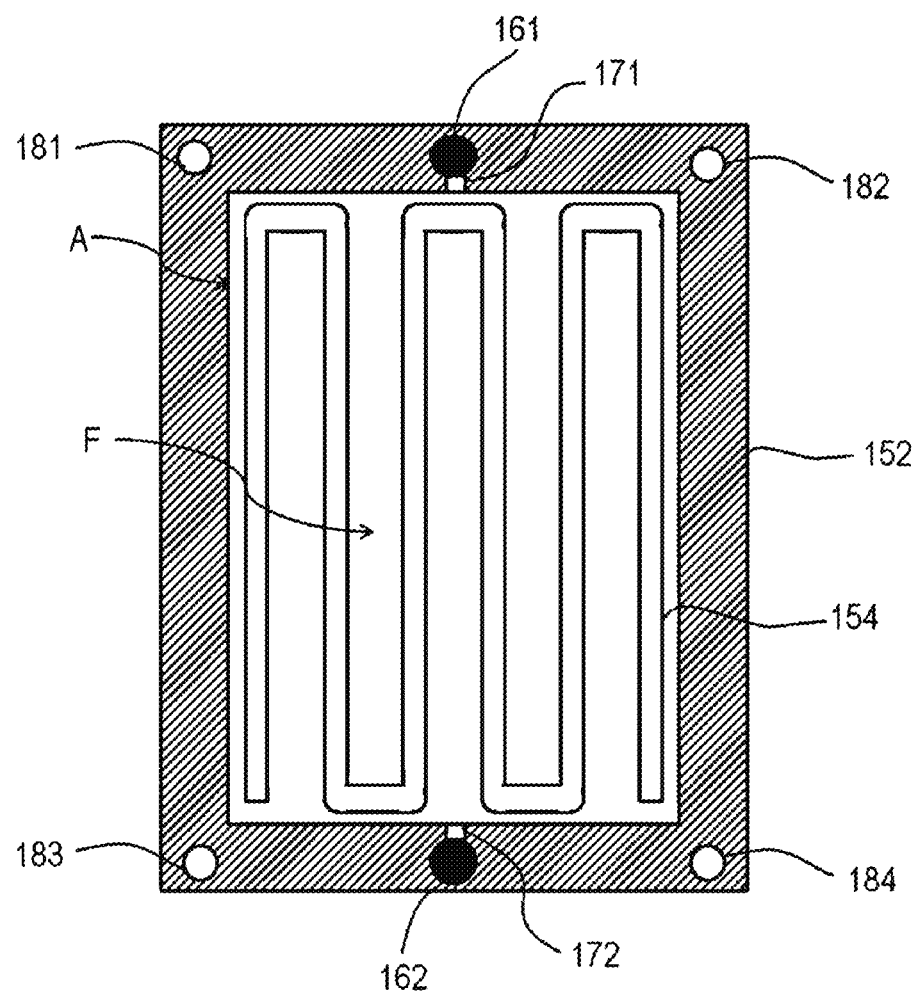

[Figure 6]
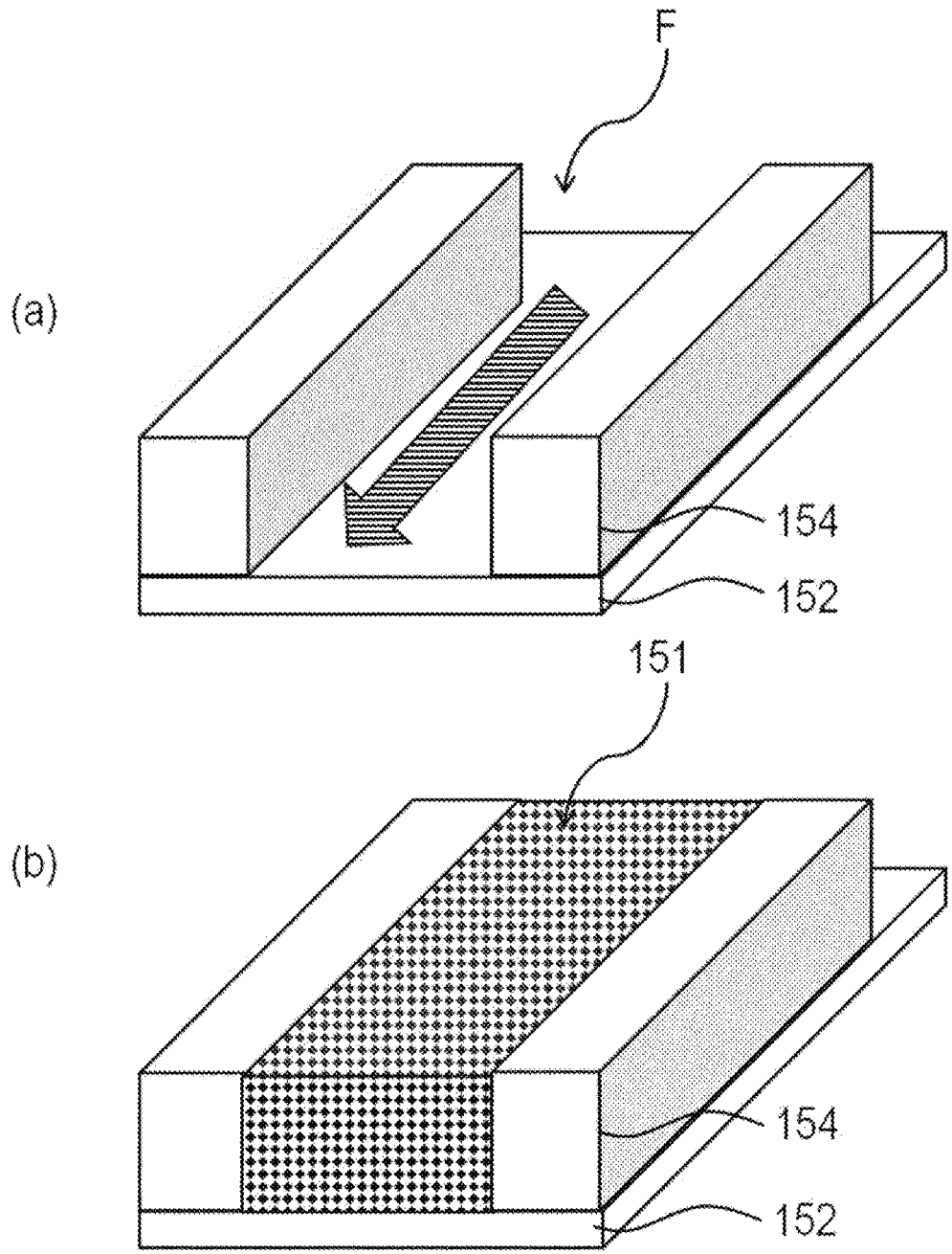

[Figure 7]
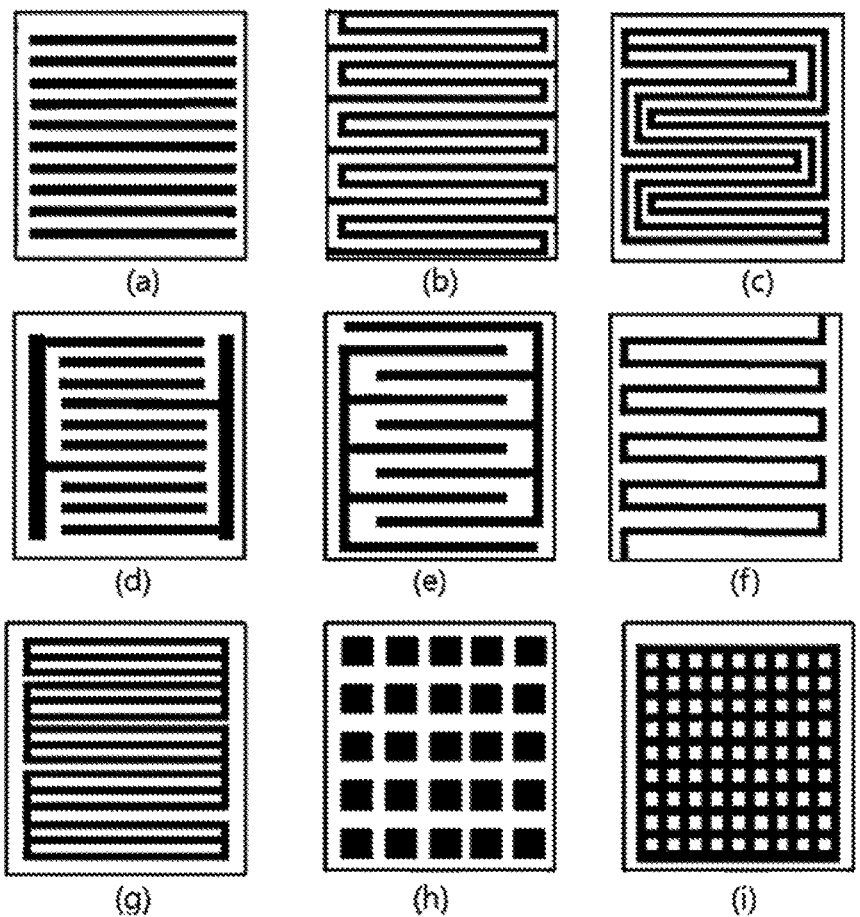
[Figure 8]
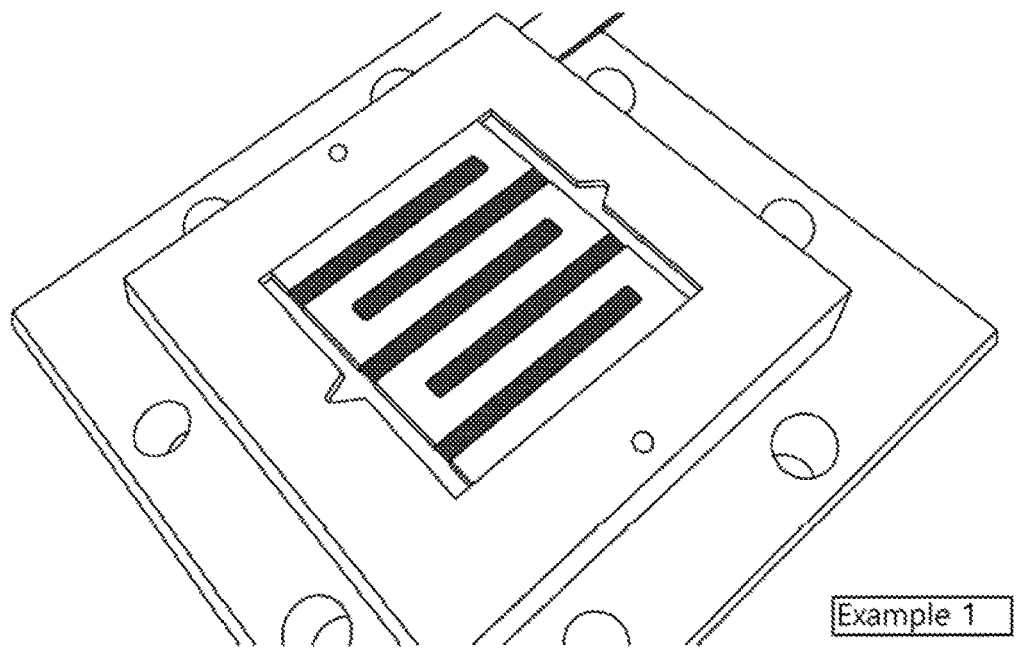
Example 1

[Figure 9]
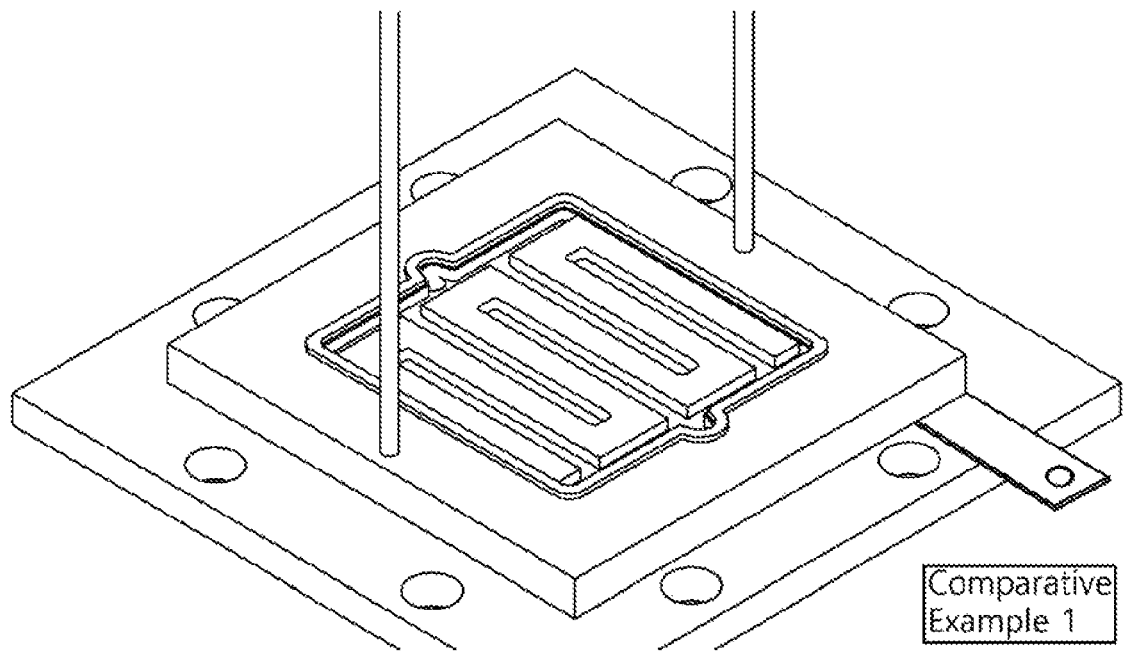
[Figure 10]
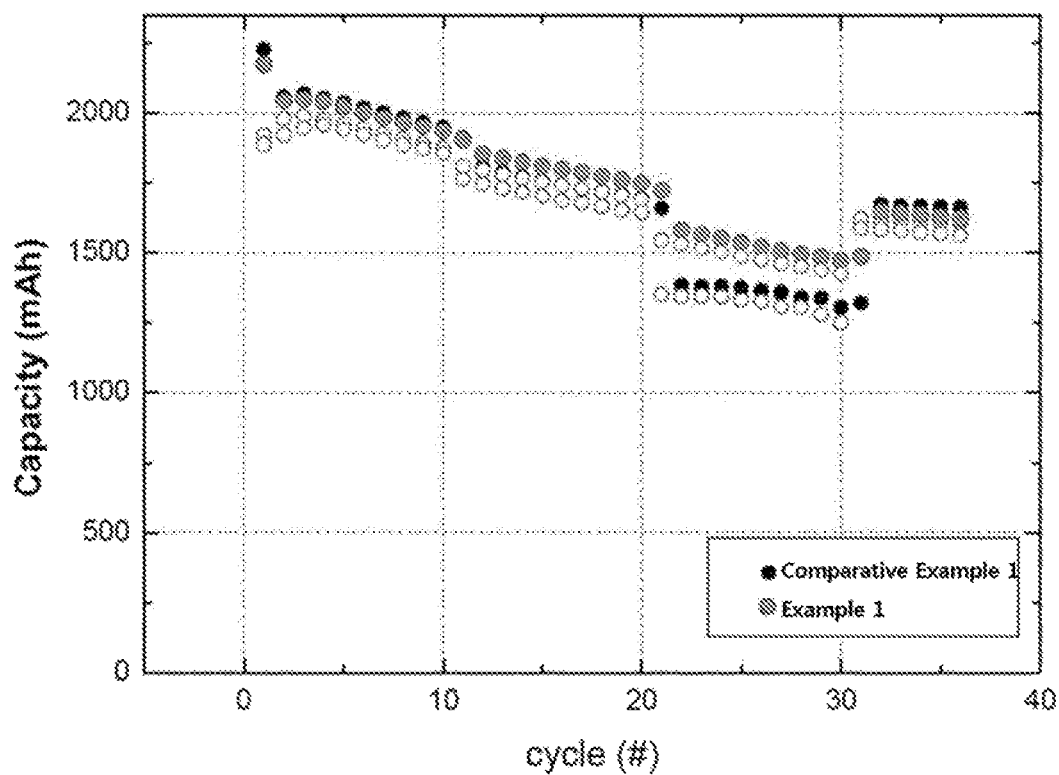

【Figure 11】
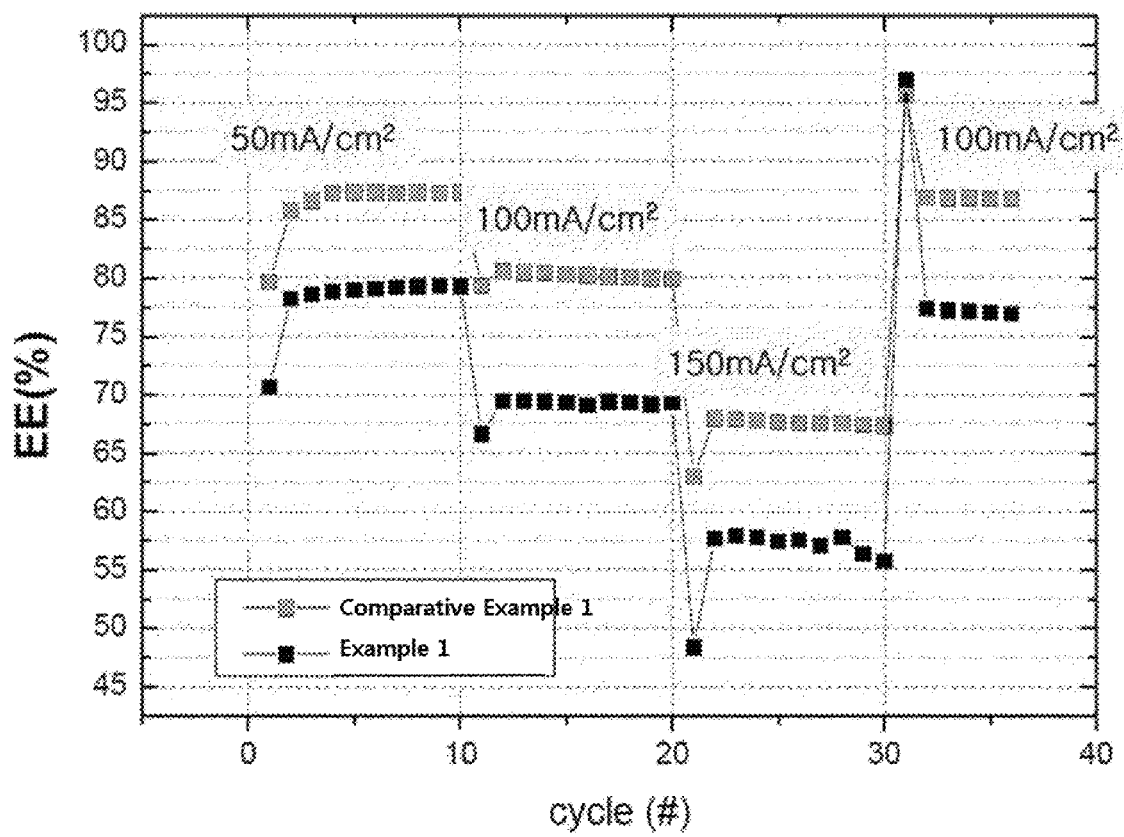

BIPOLAR PLATE AND REDOX FLOW CELL COMPRISING SAME

TECHNICAL FIELD

This application claims the benefits of priorities based on Korean Patent Application No. 10-2016-0038848, filed on Mar. 31, 2016 and Korean Patent Application No. 10-2017-0032353, filed on Mar. 15, 2017, the entire contents of which are incorporated herein by reference.

The present invention relates to a bipolar plate suitable for a battery having high flow rate and high current density and a redox flow battery including the bipolar plate.

BACKGROUND ART

Unlike conventional secondary batteries, the redox flow battery is a system in which active material in electrolyte solution is oxidized and reduced and thus charged and discharged, and is an electrochemical storage device that stores the chemical energy of the electrolyte solution directly as electrical energy. Such battery has advantages of being easy to use for large capacity power storage, having high energy density and efficiency, having a long life and being safe. In addition, the battery has attracted attention as a next generation large capacity storage device since the battery has a low maintenance cost because it does not need to be frequently replaced, it operates at room temperature, and it has an advantage that various capacity and output can be designed in various ways.

The basic structure of the redox flow battery includes an electrolyte solution tank in which active materials having different oxidation states to each other are stored, and a pump for circulating it, together with a stack including a structure of bipolar plate/electrode/ion exchange membrane/electrode/bipolar plate.

Actual electrochemical reactions occur in the stack and operate by continuously circulating the electrolyte solution into the stack using a pump. The redox pairs used as the active material in the electrolyte solution include V/V, Zn/Br, Fe/Cr and Zn/air. Among them, V/V and Zn/Br redox pairs are most widely used.

The electrochemical reaction is determined by the interaction between the electrolyte solution flowing along the bipolar plate in the stack and the electrode.

FIG. 1 is a cross-sectional view showing contact between the bipolar plate and the electrode according to the prior art wherein the bipolar plate 11/electrode 12/ion exchange membrane 13/electrode 14/bipolar plate 15 are laminated from the top. This structure is advantageous in that the structure is simple because the electrolyte solution flows directly to the bipolar plates 11 and 15. However, when the charging/discharging is performed under high power conditions or when the size of the battery is increased, there is a problem that as the electrolyte solution is accompanied by a high flow rate, a high differential pressure between the inlet and the outlet of the electrolyte solution is generated, thereby resulting in enormous energy loss.

As an attempt to solve this problem, the structure in which a flow path can be formed inside the bipolar plate and the electrolyte solution flows through the flow path was proposed.

U.S. Patent Application Publication No. 2012-0244395 proposes the structure of the bipolar plates having an interdigitated flow path.

FIG. 2 is a cross-sectional view showing contact between the bipolar plates and an electrode proposed in U.S. Patent Publication No. 2012-0244395, wherein bipolar plate 21/electrode 22/ion exchange membrane 23/electrode 24/bipolar plate 25 are laminated from the top, and flow paths 27 and 29 are formed in the bipolar plates 21 and 25, respectively. When using the bipolar plates of this type, the differential pressure between the inlet and the outlet applied to the battery module was reduced to some extent.

However, referring to the battery of FIG. 2, there is a problem that the contact area between the electrode and the electrolyte solution was reduced due to the configuration of the flow path in contrast to the battery of FIG. 1. As a result, there is a problem that the electrochemical reaction for the generation of electricity is not sufficiently performed, thereby reducing the charging/discharging capacity and the speed of the battery.

In addition, there is a problem that even if it has a flow path structure to reduce internal differential pressure, there is a certain limit in stably controlling the flow rate of the electrolyte solution over all ranges, and the electrolyte solution is retained in the flow path for a short time, thereby failing to ensure sufficient reaction time.

Therefore, there is a growing demand for redox flow batteries that can ensure sufficient reaction time and improve charging/discharging capacity and efficiency, while the energy loss can be minimized regardless of flow rate when the electrolyte solution passes through the flow path.

PRIOR ART LITERATURE

Patent Literature

U.S. Patent Publication No. 2012-0244395 (Sep. 27, 2012), "FLOW BATTERY WITH INTERDIGITATED FLOW FIELD"

DISCLOSURE

Technical Problem

The present inventors designed a bipolar plate of a new structure with fibrous conductive materials inserted in the flow path to reduce the differential pressure between the inlet and outlet of the electrolyte solution in the bipolar plate, while extending the retention time of the electrolyte solution flowing through the flow path of the bipolar plate, thereby increasing the contact between the electrolyte solution and the electrode and thus increasing the chance of electrochemical reaction, and confirmed that by applying the designed bipolar plate to the redox flow battery, charging and discharging capacity and energy efficiency may be increased, but the resistance per unit area may be lowered.

Therefore, an object of the present invention is to provide a bipolar plate having a new structure.

Another object of the present invention is to provide a unit cell for a redox flow battery having the bipolar plate.

In addition, it is another object of the present invention to provide a redox flow battery having a plurality of unit cells and targeting high flow rate and high current density.

Technical Solution

To achieve the above object, the present invention provides a bipolar plate for a redox flow battery, which comprises a body in the form of plate; and a flow path formed in the center of the body to allow the electrolyte solution to move, characterized in that fibrous conductive materials are inserted in the flow path.

In this case, it is characterized by including at least one pattern selected from patterns of parallel, serpentine, semi-serpentine, zigzag, interdigitated and pin forms.

The fibrous conductive materials are characterized by being in the form of at least one fabric selected from the group consisting of carbon felt, graphite felt, carbon cloth, carbon paper, metal cloth, metal felt and foam metal.

In addition, the present invention provides a unit cell for the redox flow battery comprising an ion exchange membrane; electrode layers disposed respectively on both sides of the ion exchange membrane; and bipolar plates disposed respectively on one side of the electrode layer, wherein the bipolar plate is the bipolar plate described above.

In addition, the present invention provides a redox flow battery comprising a battery module formed by disposing unit modules on the sides of each other, which include unit stacks for generating electric currents, and electrically connecting them; electrolyte solution tanks for supplying the electrolyte solution to the battery module and storing the electrolyte solution flowing out of the module; and electrolyte solution pumps for circulating the electrolyte solution between the module and the electrolyte solution tanks, wherein the unit stacks include a plurality of connected unit cells for the redox flow battery.

Advantageous Effects

The redox flow battery according to the present invention is provided with the bipolar plate in which the fibrous conductive materials is inserted into the flow path, and thus, the charging and discharging capacity and the energy efficiency of the redox flow battery are increased by extending the retention time in the flow path of electrolyte solution and increasing the chance of the electrochemical reaction between the electrolyte solution and the electrode while the overvoltage is lowered to lower the resistance applied per unit area.

Such a battery is a redox flow battery that targets high flow rate and high current density and can be applied to various industrial fields.

DESCRIPTION OF DRAWINGS

FIG. 1 is a cross-sectional view showing contact between the bipolar plate and the electrode according to the prior art.

FIG. 2 is a cross-sectional view showing contact between the bipolar plate and the electrode proposed in U.S. Patent Application Publication No. 2012-0244395.

FIG. 3 is a schematic diagram showing the structure of the redox flow battery according to the present invention.

FIG. 4 is a perspective view showing the unit stack according to the present invention.

FIG. 5 is a front view showing a bipolar plate according to the present invention.

FIG. 6 is a three-dimensional perspective view showing insertion of the fibrous conductive materials into the flow path of the bipolar plate according to the present invention.

FIG. 7 is a schematic diagram showing various forms of the flow path according to an embodiment of the present invention.

FIG. 8 is a photograph of the bipolar plate prepared in Example 1.

FIG. 9 is a photograph of the bipolar plate prepared in Comparative Example 1.

FIG. 10 is a graph showing the charging and discharging capacities of the batteries prepared in Example 1 and Comparative Example 1.

FIG. 11 is a graph showing the energy efficiencies of the batteries prepared in Example 1 and Comparative Example 1.

BEST MODE

The present invention provides a redox flow battery having an excellent energy efficiency and a high charging/discharging capacity.

Hereinafter, the present invention will be described in more detail with reference to the drawings.

FIG. 3 is a schematic diagram showing the redox flow battery according to an embodiment of the present invention, and FIG. 4 is a three-dimensional perspective view showing the unit stack.

Referring to FIG. 3, the redox flow battery 1000 comprises the battery module 100 formed by disposing unit modules 101, 102, 103, and 104 on the sides of each other, which include unit stacks for generating electric currents, and electrically connecting them; the electrolyte solution tanks 202 and 204 for supplying the electrolyte solution to the battery module and storing the electrolyte solution flowing out of the module 100; and the electrolyte solution pumps 302 and 304 for circulating the electrolyte solution between the battery module 100 and the electrolyte solution tanks 202 and 204.

In this case, the unit stack is formed by laminating a plurality of unit cells 130. For convenience, FIG. 4 illustrates a unit stack formed by laminating single unit cell 130.

Referring to FIG. 4, the ion exchange membrane plate 123 is disposed at the center of the unit cell 130 and the electrode plates 120 and 121 and the bipolar plates 118 and 119 respectively are symmetrically disposed on both sides of the ion exchange membrane plate 123.

The unit cell 130 has a structure in which one or more plural plates are laminated. The collector plates 115 and 117 are laminated so as to contact with the bipolar plates 118 and 119 and then the end plates 111 and 113 are laminated.

Each of the components is bonded to each other by a connection member (e.g., a bolt/nut) through a perforated hole on each one side of them to form the unit cell 130, and a plurality of such unit cells 130 are arranged, and then the unit stack is formed through electrical connection.

A spacer (not shown) for flow of electrolyte solution or bonding may be interposed respectively between the ion exchange membrane plate 123, the electrode plates 120 and 121, the bipolar plates 118 and 119, the collector plates 115 and 117, and the end plates 111 and 113, and for example, it is preferred that a spacer be disposed between the ion exchange membrane plate 123 and the electrode plates 120 and 121.

A plurality of unit cells 130 are connected in series or connected in parallel as shown in FIG. 3, and are configured to generate electric current by circulating the electrolyte solution. The unit stack is electrically connected to the other neighboring unit stack through a bus bar (not shown). The unit modules 101, 102, 103, and 104 and the battery module 100 discharge electric currents generated inside the unit stacks or connect them to an external power source.

Referring to the structure of the unit cell 130, the ion exchange membrane plate 123 has a structure including a body in the form of plate and an ion exchange membrane mounted at the center thereof. In addition, the electrode plates 120 and 121 have a structure including a body in the form of plate and an electrode layer mounted at the center thereof. Also, the bipolar plates 118 and 119 have a structure including a body in the form of plate and a flow path mounted at the center thereof.

In the present invention, the battery characteristics of the redox flow battery 1000 are improved by changing the configuration of the bipolar plates 118 and 119 constituting the unit cell.

The bipolar plates 118 and 119, which are adjacent to the electrode plates 120 and 121, are supplied with the electrolyte solution from the electrolyte solution tanks 202 and 204 for the electrochemical reaction, and the supplied electrolyte solution is supplied to the electrode plates 120 and 121 at a uniform pressure and amount.

FIG. 5 is a front view showing the bipolar plate.

Specifically, the bipolar plates 118 and 119 include a body 152 in the form of plate, electrode layer, and the flow path (F) formed so that the electrolyte solution within the electrolyte solution reaction part (R), which is the area where the electrolyte solution is contacted, can move.

The body 152 of the bipolar plates 118 and 119 may be made of a conductive or nonconductive material and is not particularly limited in the present invention. In the case of a conductive material, the surface of the body may be coated with metal or a carbon material such as graphite, or a conductive polymer. In the case of a nonconductive material, it can be used by coating with fluorine resins such as ethylene-tetrafluoroethylene (ETFE), polytetrafluoroethylene (PTFE), perfluoroalkoxy (PFA), fluorinated ethylene propylene polymer (FEP), ethylene chlorotrifluoroethylene (ECTFE) or polyvinylidene fluoride (PVDF).

The bipolar plates 118 and 119 include the inlet 161 on the upper side of the body 152 for introducing an electrolyte solution into the electrode plates 120 and 121, the outlet 162 on the lower side of the body 152 for discharging the electrolyte solution, an electrolyte solution reaction part R in contact with the electrode plates 120 and 121, the supply flow path 171 located between the outlet 161 and the electrolyte solution reaction part R for uniformly distributing the electrolyte solution, and the discharge flow path 172 located between the outlet 162 and the electrolyte solution reaction part R for uniformly distributing the electrolyte solution.

Connecting members 181, 182, 183, and 184 are disposed at one end of the body 162 and physically bonded to the electrode plate.

In addition, the supply flow path 171 and the discharge flow path 172 may have various shapes such that the flow rate of the electrolyte solution can be uniformly supplied or discharged, and for example, a form of a distribution flow path having a plurality of branches may be provided.

In the redox flow battery 1000, the flow of the electrolyte solution is very important. The electrolyte solution moved through the electrolyte solution pumps 302 and 304 moves to the bipolar plates 118 and 119 having the flow path F, and then contacts with electrode plates 120 and 121 having the electrode layers that cause redox. In this case, if the flow rate characteristics of the electrolyte solution are not uniform, a speed difference in the electrode layer is generated or an overvoltage due to the part that cannot react is generated. When the overvoltage occurs, the temperature inside the stack rises. When the vanadium-based electrolyte solution is used as the electrolyte solution, precipitation has occurred, and the flow path is blocked. $V_2O_5$ (vanadium oxide) precipitated in the solid state clogs the flow path, which is a migration path of the electrolyte solution, and reduces the reaction site with the electrolyte solution, thereby decreasing battery efficiency. In addition, clogging phenomenon due to precipitation increases the internal pressure, and thus leaks are generated by expanding the gasket portion of the unit stack connected in series. As a result, the above problems may cause malfunction and shutdown, and then may cause problems to the whole system.

Accordingly, it can be seen that the performance and lifetime of the unit stack of redox flow battery 1000 depends on the flow rate characteristics of the electrolyte solution. In order to improve the flow rate characteristics, a method of using an additional device outside the unit stack of the battery has been used, but in accordance with those, there is a disadvantage that the installation is not easy due to an increase in the surrounding equipment and an increase in the volume.

In the present invention, fibrous conductive materials 151 are inserted into the flow path in bipolar plates 118 and 119.

FIGS. 5 (*a*) and 5 (*b*) are the three-dimensional perspective views showing that the partition walls 154 is disposed on the body 151 of the bipolar plates 118 and 119 to form the flow path F and the fibrous conductive materials 151 are inserted into the flow path F.

As shown in FIG. 5 (*b*), by inserting the fibrous conductive materials (151), the retention time of the electrolyte solution passing through the inside of the flow path F is extended so that the reaction time of the electrode can be sufficiently ensured and the charging/discharging capacity of the redox flow battery 1000 can be increased, as well as the differential pressure of the electrolyte solution at the inlet/outlet of the bipolar plates 118 and 119 can be drastically reduced.

When the fibrous conductive materials 151 are installed in the supply flow path 171 or the discharge flow path 172, since the differential pressure between the inlet 161 and the outlet 162 can be increased by influencing the fluid flow of the electrolyte solution, it is installed in the reaction part R of the electrolyte solution adjacent to the electrode plate.

The fibrous conductive materials 151 (or conductive fibers) refer to a plurality of fibrous structures forming a three-dimensional porous network structure. The material of the fibrous conductive materials 151 inserted in the flow path F can be any material as long as it has some degree of porosity and has conductivity. Preferably, in order to enhance the reaction between the electrolyte solution and the electrode layer of the electrode plates 120 and 121 without blocking the flow of the electrolyte solution, it is preferable to use the same or similar materials used in the electrode layers of the electrode plates 120 and 121.

More preferably, the fibrous conductive materials 151 of the present invention mean that fibers made of carbon or metal material are aggregated and laminated in a plate-like form.

The fibrous conductive materials 151 are characterized by being in the form of at least one fabric selected from the group consisting of carbon felt, graphite felt, carbon cloth, carbon paper, metal cloth, metal felt and foam metal.

The "carbon felt or graphite felt" means that fibers prepared by a spinning process of carbon or graphite material form an irregular aggregate (mat shape) in the form of a plate.

The "carbon cloth" means that the carbon fiber prepared through the spinning process forms a three-dimensionally regular aggregate through weaving.

The "carbon paper" means that carbon fibers aggregate to form a paper-like aggregate.

The "metal cloth" means that the metal fiber prepared through the spinning process forms a three-dimensional regular aggregate through weaving.

The "foam metal" refers to a three-dimensional structure in which a metal material has a large number of air bubble lattices through the foaming process.

The metal cloth and the foam metal may be, for example, used including one or more metals selected from Na, Al, Mg, Li, Ti, Zr, Cr, Mn, Co, Cu, Zn, Ru, Pd, Rd, Pt, Ag, Au, W, Ni and Fe.

The fibrous conductive materials 151 have a three-dimensional mesh structure in which the fibers are regularly bonded or in the case of a felt, are irregularly bonded, and thus the migration of the electrolyte solution can be facilitated due to the large number of pores, while the rigidity is high, and the deformation is not easily performed. The fibrous conductive materials 151 may complexly include micropores, mesopores, macropores, and the like, and the pore control may vary depending on the preparing method.

In the case of conductive particles such as carbon black, there is a problem that it is difficult to fix in the flow path F, and it is difficult to control the flow rate of the electrolyte solution due to easy movement, even when fixed, during operation of the battery. In addition, in the case of metal mesh, turbulence may be generated during the flow of the electrolyte solution, thereby causing a problem that the pressure difference in the battery becomes larger. Thus, the use of fibrous conductive materials 151 is most desirable.

The fibrous conductive materials 151 require control of parameters for physical properties, in order not to interfere with the flowability of the electrolyte solution. Various parameters related to the flowability of the electrolyte solution can be considered, but the porosity of fibrous conductive materials 151 and the bulk density associated with them can be preferentially mentioned.

When the porosity is too low or too high, the flow of the electrolyte solution is retarded by the filling of fibrous conductive materials 151, and thus the differential pressure measured at the inlet 161 and outlet 162 of the electrolyte solution is increased and the battery is overloaded by overvoltage, resulting in deterioration of battery performance. The porosity is a parameter related to the fabric density. If the bulk density is too high, the fluid flow of the electrolyte solution may be prevented and thus the differential pressure within the battery may be high. Conversely, if the fabric density is too low, the retention time of the electrolyte solution inside the flow path F cannot be sufficiently increased.

Preferably, the porosity of the fibrous conductive materials 151 is 10 to 99%, preferably 50 to 95%, and the bulk density is 0.05 to 0.2 g/cm$^3$, preferably 0.1 to 0.15 g/cm$^3$ based on 3 mm thickness.

In this case, the diameter of each fiber constituting the fibrous conductive materials 151 is 0.5 to 50 μm, preferably 0.1 to 30 μm, and the average diameter of the fibrous conductive materials 151 may be 0.01 to 900 μm, preferably 0.05 to 500 μm.

The material of the fibrous conductive materials 151 of the present invention may be a carbon material, a metal material, or a combination thereof, preferably carbon felt. The carbon felt and the graphite felt have characteristics of chemical resistance, stability in a wide voltage range, and high strength. The metal cloth or foam metal can increase electrochemical reaction rate due to high conductivity.

These fibrous conductive materials 151 can be prepared directly or customized to fit the flow path F of the bipolar plates 118 and 119.

As an example, the carbon felt can be produced by carbonizing carbon fiber precursor felt. The carbon fiber precursor felt can be made of rayon fiber, polyacrylonitrile fiber, etc., and carbonization and graphitization are performed in the nitrogen atmosphere or the vacuum atmosphere. The carbon fiber precursor felt is decomposed and removed by carbonization and graphitization of the remaining elements except for carbon, thereby leaving only carbon to form a carbon felt.

The fibrous conductive materials 151 of the present invention may be surface-treated or further includes additional materials in order to increase the conductivity of the felt material or to promote the redox reaction.

Since carbon felt has a hydrophobic surface, in order to easily react the electrolyte solution with the electrode, it is very important that the surface polymer is removed, the oxygen functional group is introduced, and the hydrophilic property is improved. In the case of carbon materials, when other anions are introduced, the electrochemical performance is changed, and particularly, for nitrogen element, the electrochemical characteristics such as oxidation/reduction reaction are increased.

As an example, the surface treatment is performed by heat-treating at about 300 to 450° C. for about 1 to 15 hours so that the functional group is formed on the surface in order to improve the affinity with the electrolyte solution, or by heat-treating at a temperature of 140 to 600° C. for 4 minutes to 7 hours under an ozone or air atmosphere to introduce an oxygen functional group such as a carboxyl group, a carbonyl group, or a hydroxyl group on the surface, or by adding a nitrogen precursor in an inert gas atmosphere and heat-treating at a temperature of 800 to 1000° C. for 10 to 60 minutes to introduce a nitrogen functional group to the surface.

In addition, additional additive materials may be consisted of carbon based conductive materials and/or metal particles.

The carbon based conductive materials may be at least one selected from the group consisting of carbon paper, carbon fiber, carbon black, acetylene black, activated carbon, fullerene, carbon nanotube, carbon nanowire, carbon nano-horn, and carbon nano ring.

The metal particle may be at least one selected from the group consisting of Na, Al, Mg, Li, Ti, Zr, Cr, Mn, Co, Cu, Zn, Ru, Pd, Rd, Pt, Ag, Au, W, Ni and Fe. They can have a particle size from a few nanometers to a few hundred microns for the catalytic effect of an electrochemical reaction, and preferably have a nanoscale particle size.

The additional material may be used at a level that does not prevent the flow of the electrolyte solution, and may be used in an amount of 10 wt. % or less in the fibrous conductive materials 151.

These surface treatments or additional substances can be used individually or in combination, and as a result, the redox reaction becomes smoother, the electron transfer rate due to redox and the reversibility of redox are also increased, and thus the performance of the redox flow battery 1000 is improved.

The flow path F is formed through the partition walls 154, and in this case, the width and the thickness of the partition walls 154 can be appropriately adjusted according to the sizes of the bipolar plates 118 and 119. Referring to FIG. 5, the distance between the partition walls 154 is defined as the flow path channel width, and the thickness of the partition walls 154 is defined as the depth of the flow path channel.

The cross-section of the partition wall 154 may be of various shapes such as rectangular, square, triangular, trench, hemispherical, polygonal, and the like, and may typically be rectangular in shape for the flow of the electrolyte solution.

In general, when the bipolar plates 118 and 119 having a width*length of 5 to 10 cm² are prepared, the width of the partition wall 154 is 3.0 to 8.0 mm, the thickness is 1 to 3.5 mm, the flow path channel width is 3.0 to 8.0 mm, and the depth of the flow path channel is 1 to 3.5 mm.

In this case, filling of the fibrous conductive materials 151 can be performed at a volume of 10 to 100%, preferably 50 to 95%, with respect to the flow path volume (flow path channel width*flow path channel depth*length of partition wall).

In addition, when the filling thickness is adjusted, the fibrous conductive materials 151 are arranged so that the depth X of the flow path channel satisfies the formula 1<Y/X≤2.5, preferably 1<Y/X≤1.5, and then the fibrous conductive materials 151 are fixed inside the flow path F by applying a predetermined pressure. In this case, the thickness Y of the fixed fibrous conductive materials 151 finally fixed after the pressure application may be equal to the maximum flow path channel depth X and thus keep horizontal, or may be formed to be slightly higher or lower than the maximum flow path channel depth X (0.8≤Y/X≤1.2) and may be formed to satisfy the formula 0.8≤Y/X≤1.0 when considering the flow of the electrolyte solution.

In this case, it is necessary to adjust the interval between the flow paths F and the internal width of the flow paths F in order to increase the flowability of the battery in the flow path F.

When the horizontal direction width of the reaction part R of the electrolyte solution is W1 and the horizontal direction width of the flow path channel is W2, W1:W2 has a ratio of 1:10 to 10:1. More specifically, when the number of flow paths is the same, if the interval between the flow paths F is excessively dense and the flow path channel width W2 is wide, it is difficult to control the internal differential pressure generated depending on the flow rate because there is almost no difference from the bipolar plates 118 and 119 with no flow path, and on the contrary, if the width W1 is too wide and the flow path channel width W2 is narrow, a sufficient amount of the electrolyte solution is difficult to flow into the flow path F, thereby deteriorating the efficiency of the battery.

If the filling volume and filling thickness are not adjusted, it is preferable that since the fluid flow of the electrolyte solution may be influenced, differential pressure may occur, or the value of resistance applied per unit area may increase, and thus the charging and discharging electric current density may be lowered, then it is preferable that the bipolar plates 118 and 119 are prepared while controlling the filling degree of the fibrous conductive materials 151 in consideration of the above parameters.

Meanwhile, the flow paths F of the bipolar plates 118 and 119 according to the present invention may be composed of various types of flow paths as shown in FIG. 6.

The form of the flow paths F may include various forms known in the art relating to fluid flow, and for example, various forms as shown in FIG. 7 are possible.

Referring to FIG. 7, the flow paths F may include various forms such as a) parallel, b) serpentine, c) and d) semi-serpentine, e) interdigitated, f) zigzag, and (h) and (i) pin, wherein the start and end of the flow path have an open or closed form.

According to a preferred embodiment of the present invention, the flow paths F of the bipolar plates 118 and 119 may have an interdigitated form.

The interdigitated flow path structure means that the flow paths F interdigitated with each other are continuously arranged, and each flow path F has a one-side closed structure in which the inlet or outlet of the flow path F is alternately opened. In the case of the interdigitated flow path structure, since the electrolyte solution flows not only along the flow path but also over the flow path F, the opportunity for electrode reaction can be further increased to increase the charging/discharging capacity of the redox flow battery 1000.

However, in this interdigitated flow path structure, since only a portion of the electrolyte solution flowing into the flow path F reacts with the electrode layers 32a and 32b, there is a limit to maximizing the reaction efficiency per unit volume of the electrolyte solution. In particular, even when the electrolyte solution is provided at a high flow rate for high power or high density of the battery, it is difficult to ensure sufficient retention time of the electrolyte solution in the flow path F.

As proposed in the present invention, when the fibrous conductive materials 151 are filled in the flow path F, the electrolyte solution does not flow along the flow path, but contacts the fibrous conductive materials 151 inserted within the flow path and is transferred to the next adjacent flow path F beyond one flow path F through the electrode layers adjacent to the bipolar plates 118 and 119. That is, while the electrolyte solution does not simply flow but remains in flow path F and reacts sufficiently with fibrous conductive materials 151, and at the same time, sufficiently contacts and reacts with the electrode layers adjacent to bipolar plates 118 and 119, the electrolyte solution is transferred by repeating several times the process of slowly transferring from one flow path F to another adjacent flow path F in the way of contact transfer.

In this structure, efficient electrode reactions can occur even with the same amount of the electrolyte solution due to the fibrous conductive materials 151 inserted into the flow path F, and the transfer rate (flowability) of the electrolyte solution can be controlled. This is because the electrolyte solution does not pass through the flow path F but firstly contacts with the fibrous conductive materials 151 and then is diffused in various directions while retaining thereon for a predetermined time, and the retention time of the electrolyte solution becomes longer, the response surface area becomes wider, and the chance of the electrode reaction increases.

In addition, the increase in the reaction area results in a reduction in the overvoltage that is imposed on the reaction of the electrolyte solution, resulting in an increase in the efficiency of the battery. In such a structure, the pressure difference at the inlet/outlet of the electrolyte solution of bipolar plates 118 and 119 may also be reduced in the case of the flow battery in which the electrolyte solution is transported at a high flow rate.

As a result, according to one embodiment of the present invention, when bipolar plates 118 and 119 having an interdigitated flow path structure in which fibrous conductive materials 151 are inserted are employed, the fluid flow of the electrolyte solution increases the area of the electrochemical reaction and thus reduces the resistance per unit area. Thus, even if a large capacity battery is implemented, it is possible to implement a battery with higher energy efficiency along with higher charging and discharging capacity and electric current efficiency.

The bipolar plates 118 and 119 having the above-described structure are bonded to the electrode plates 120 and 121 and the ion exchange membrane plate 123 to form a unit cell.

The ion exchange membrane plate 123 includes a body in the form of plate and an ion exchange membrane inserted into the center thereof, and the electrode plates 120 and 121 have a structure including a body in the form of plate and an electrode layer mounted at the center thereof.

The ion exchange membrane of the ion exchange membrane plate 123 is referred to as an ion permeable membrane or separator, configured to pass ions in the electrolyte solution, and generates electricity through an electrochemical reaction of the electrode layers of the electrode plates 120 and 121 located on both sides through the electrolyte solution. In this case, the material, thickness, and components of the ion exchange membrane are not particularly limited in the present invention, and any known ones can be used.

Additionally, for the electrode plates 120 and 121 located between the ion exchange membrane plate 123 and the bipolar plates 118 and 119, one plate of the electrode plates functions as a positive electrode and the other plate functions as a negative electrode depending on the composition of the electrolyte solution. The electrode plates 120 and 121 have an electrode layer for electrochemical reactions inside the body, and a known conductive material is used for the electrode layer. As an example, the electrode layer may be one conductive material selected from the group consisting of carbon felt, graphite felt, carbon cloth, carbon paper, metal cloth, metal felt, and foam metal.

The electrode layer uses the same or similar fibrous conductive materials (151) as described in bipolar plates 118 and 119, i.e., follows the composition and physical properties (e.g., porosity, bulk density) as referred to as the fibrous conductive materials 151.

For the electrochemical reaction, the fibrous conductive materials (151) and electrode layers filled in the bipolar plates 118 and 119 may preferably be the same material to each other, and more preferably, both materials may be carbon felt.

In addition, the fibrous conductive materials 151 and the electrode layer may have the same or similar porosity. Preferably, the porosity of the electrode layer may be controlled to be greater than the porosity of the fibrous conductive materials 151 in the bipolar plates 118 and 119. In this case, the electrolyte solution sufficiently permeates into the fibrous conductive materials 151 with many voids and remains within the flow paths F, and therefore, the maximum contact area for the reaction can be provided, the electrolyte solution may be contained within the flow path F until the reaction is sufficiently advanced, and the control of the differential pressure can also be made more delicately.

In addition, the electrode layer of the present invention may have a gradient form if necessary. This gradient can solve the non-uniformity of the reaction, the decrease in the current density, and the increase in the local resistance in the flow paths F due to the pressure gradient necessarily occurring at the inlet 161 and outlet 162 of the bipolar plates 118 and 119.

According to one embodiment, considering the fluid flow of the electrolyte solution, a material having a gradient of porosity or a gradient of pore size can be used, or when using additional materials such as metal particles, they may be coated or impregnated so as to have a concentration gradient.

The gradient may be in the same direction with respect to the vertical direction of the inlet 161 and the outlet 162 of the bipolar plates 118 and 119, or in the orthogonal direction or the predetermined angle thereto. Preferably, the gradient may be in the vertical direction to the inlet 161.

In addition, the gradient may be in the same direction with respect to the longitudinal direction of the flow paths F of the bipolar plates 118 and 119, or in the orthogonal direction or the predetermined angle thereto. Preferably, the gradient may be in the same direction with respect to the longitudinal direction of the flow paths F.

According to another embodiment of the present invention, the retention time of the electrolyte solution can be increased by increasing the porosity of the electrode layer adjacent to the inlet 161 and outlet 162 of the bipolar plates 118 and 119 and gradually decreasing it toward the central part.

According to another embodiment of the present invention, the electrolyte solution is not excessively stagnated within the flow path F and achieves the flow balance by designing to have higher porosity stepwise or gradually at the outlet 162 side than the inlet 161 of the bipolar plates 118 and 119 to enable relatively fast diffusion and movement of the electrolyte solution to various directions.

According to another embodiment of the present invention, the electrochemical reaction in the electrode layer can be further promoted by decreasing the content of metal catalyst present in the electrode layer adjacent to inlet 161 and outlet 162 of bipolar plates 118 and 119 and gradually increasing it toward the central part.

According to another embodiment of the present invention, the electrochemical reaction can be further promoted while the flow rate of the electrolyte solution is controlled, by increasing the porosity and the content of the metal catalyst of the electrode layer adjacent to the outlet 162 than at the inlet 161 of the bipolar plates 118 and 119.

Along with the concentration gradient, the electrode layer of the present invention may be composed of a single material as single layer or a combination of different materials. As an example, the electrode layer is divided into a plurality of areas, and the material of the electrode layer corresponding to each area can be changed.

In addition, the electrode layer of the present invention may be formed as a single layer or a plurality of layers of two or more layers using one material or different materials. In the case of forming the plurality of layers, the above-mentioned materials, porosity, and the content of the additional materials such as the metal catalyst may be the same or different from each other.

The selection of such a constitution and material is not particularly limited in the present invention, and can vary depending on the charging and discharging capacity and intended use of the battery.

In addition, the area of the electrode layer of the present invention may be the same as or different from the area of the reaction part A of the electrolyte solution of bipolar plates 118 and 119, and is selected so as to sufficiently react with the electrolyte solution.

In the redox flow battery unit cell according to a preferred embodiment of the present invention, the bipolar plates 118 and 119 have an interdigitated flow path F filled with carbon felt therein, and the carbon felt or carbon paper is used for the electrochemical reaction part of the electrode plate.

In this case, the carbon felt filled in the bipolar plates 118 and 119 and the carbon felt of the electrode plate are preferably made of the same material with each other, and in this case, each carbon felt can have different porosity with each other.

More preferably, the porosity of the carbon felt in the electrode plate can be adjusted to be greater than the porosity of the carbon felt in the bipolar plates 118 and 119. In this case, the electrolyte solution sufficiently permeates into the fibrous conductive materials 151 with many voids and remains within the flow paths F, and therefore, the maximum contact area for the reaction can be provided, the electrolyte solution may be contained within the flow path F until the reaction is sufficiently advanced, and the control of the differential pressure can also be made more delicately.

According to another embodiment of the present invention, the carbon felt may be filled to be different in porosity from the top to the bottom or from the left to the right with respect to the vertical direction of the body 152 of the bipolar plates 118 and 119. That is, the electrolyte solution is not excessively stagnated within the flow path F and achieves the flow balance, by setting the porosity of the upper side to be lower than that of the lower side, and designing the porosity to increase stepwise or gradually toward the lower side in the vertical direction, and thus enabling relatively fast diffusion and migration of electrolyte solutions in various directions.

Meanwhile, other elements for constituting the redox flow battery 1000 according to the present invention, specifically, components such as various elements for constituting the battery module 100, the electrolyte solution tanks 202 and 204, and the electrolyte solution pumps 302 and 304 are not particularly limited in the present invention, but follow the contents as known.

The electrolyte solution stored in the electrolyte solution tanks 202 and 204 is not particularly limited in the present invention, and the electrolyte solution as known in the art can be used.

The electrolyte solution contains an active material and a solvent, wherein the active material includes a redox couple organic matter with electrochemically stable reactivity and the solvent may be an aqueous solvent, an organic solvent or a mixture thereof.

The electrolyte solution may be a positive electrode electrolyte solution for the function of a positive electrode or a negative electrode electrolyte solution for the function of a negative electrode, and these include redox pair configurations. That is, in the case of the positive electrode active material, it refers to a redox pair to be dissolved in a positive electrode electrolyte solution and means that the redox pair is charged when the oxidation state is changed to the higher oxidation state among two oxidation states, that is, when oxidation occurs. In the case of the negative electrode active material, it refers to a redox pair to be dissolved in a negative electrode electrolyte solution and means that the redox pair is charged when the oxidation state is changed to the lower oxidation state among two oxidation states, that is, reduction occurs.

The active material used in the present invention is not particularly limited, and the active materials commonly used in the art can be used. For example, V, Fe, Cr, Cu, Ti, Sn, Zn, Br and the like can be mentioned. This active material can be obtained as various redox pairs such as V/V, Zn/Br, and Fe/Cr by combination of oxidation/reduction differences. In the present invention, the redox pair consisted of V/V is used. In this way, there is an advantage that the irreversible contamination by the mixing phenomena between two electrodes can be overcome by using the same type of redox pair in the positive electrode and the negative electrode. For example, the positive electrode electrolyte solution may include $V^{4+}/V^{5+}$ as a redox pair, and the negative electrode electrolyte solution may include $V^{2+}/V^{3+}$ as a redox pair.

The aqueous solvent is one or a mixture of two or more selected from sulfuric acid, hydrochloric acid or phosphoric acid. The organic solvent is one or a mixture of two or more selected from acetonitrile, dimethyl carbonate, diethyl carbonate, dimethyl sulfoxide, dimethylformamide, propylene carbonate, ethylene carbonate, N-methyl-2-pyrrolidone, fluoroethylene carbonate, ethanol, methanol and gamma-butyrolactone.

Additionally, the electrolyte solution may further comprise a supporting electrolyte.

The supporting electrolyte may be selected from the group consisting of an alkylammonium-based salt, a lithium salt and a sodium salt. In the electrolyte solution for the redox flow battery according to the present invention, the alkylammonium-based salts may be a combination of one anion selected from $PF_6^-$, $BF_4^-$, $AsF_6^-$, $ClO_4^-$, $CF_3SO_3^-$, $CF_3SO_3^-$, $C(SO_2CF_3)_3$, $N(CF_3SO_2)_2$ and $CH(CF_3SO_2)_2$ and ammonium cation wherein the alkyl is methyl, ethyl, butyl or propyl. In the electrolyte solution for the redox flow battery according to the present invention, the lithium salt may be at least one selected from $LiPF_6$, $LiBF_4$, $LiAsF_6$, $LiClO_4$, $LiCF_3SO_3$, $LiCF_3SO_3$, $LiC(SO_2CF_3)_3$, $LiN(CF_3SO_2)_2$ and $LiCH(CF_3SO_2)_2$. In the electrolyte solution for the redox flow battery according to the present invention, the sodium salt may be at least one selected from $NaPF_6$, $NaBF_4$, $NaAsF_6$, $NaClO_4$, $NaCF_3SO_3$, $NaCF_3SO_3$, $NaC(SO_2CF_3)_3$, $NaN(CF_3SO_2)_2$ and $NaCH(CF_3SO_2)_2$.

The electrolyte solution pumps 302 and 304 are not specifically referred to in the present invention, and those known in the art may be used.

The redox flow battery 1000 according to the present invention includes the bipolar plates 118 and 119 described above as the components of the unit cell, thereby increasing a substantial charging/discharging opportunity with regard to the electrolyte solution in the flow path F. In addition, the electrolyte solution can be retained in the flow path F for a sufficient time for the reaction, and in particular, the internal differential pressure with regard to the electrolyte solution flowing at a high flow rate can be reduced more effectively than in the prior art. In addition, it is possible to obtain an effect of increasing the battery efficiency by increasing the reaction area and thus reducing the overvoltage applied to the reaction of the electrolyte solution.

The redox flow battery 1000 can maximize the charging/discharging capacity and efficiency while minimizing energy loss regardless of the flow rate of the electrolyte solution and battery output and thus is preferably applied as a redox flow battery 1000 that targets high flow rate and high current density. Therefore, it can be effectively utilized in various fields such as various industrial facilities, electronic products, and automobiles.

Hereinafter, the examples of the present invention will be described in detail in order to enable those skilled in the art to which the present invention pertains to easily carry out the present invention. The present invention may, however, be embodied in many different forms and should not be construed as limited to the examples set forth herein.

Example 1

(1) Preparation of Bipolar Plate

As shown in FIG. 8, a bipolar plate having the fibrous conductive materials inserted inside the flow path was prepared.

Referring to FIG. 8, the bipolar plate has a body having a width of 82 mm and a length of 82 mm and an interdigitated flow path formed inside. In this case, the width of the partition wall to form the flow path is 5.0 mm, the channel width of the flow path is 4.0 mm, and the channel depth of the flow path is 2.5 mm.

As fibrous conductive materials, carbon felt (thickness 3.5 mm) with porosity of 95% was purchased and cut it to fit the channel width of the flow path.

Then, the fibrous conductive materials were mounted on the flow path and then inserted into the flow path by applying pressure. At this time, the pressure was applied until the thickness of the fibrous conductive materials was equal to the depth of the channel in the flow path.

(2) Preparation of Unit Cell

The unit cell was prepared by constructing the bipolar plate prepared in (1) above.

The electrode layers (900 μm) made by lamination of three sheets of carbon paper (300 μm in thickness) were placed on both sides of the ion exchange membrane (Nafion 115, 75 μm), and bipolar plates were placed on each outer side, and thereafter these were tightened with a 0.5 t gasket to form a redox flow battery.

The electrolyte solution was injected into each of the inlet and outlet of the bipolar plate. At this time, 50 ml of 1.6M $VOSO_4$ (3M $H_2SO_4$) was used as the electrolyte solution and the flow rate was 25 cc/min.

Comparative Example 1

As shown in FIG. 9, a bipolar plate in which the fibrous conductive materials was not inserted in the flow path was prepared and then a redox flow battery was prepared in the same manner as in Example 1.

Experimental Example 1

Charging and discharging capacity and energy efficiency were measured using the unit cell prepared in each of Example 1 and Comparative Example 1, and the obtained results are shown in FIGS. 10 and 11. Charging and discharging conditions were sequentially 10 cycles at 1.25 A, 10 cycles at 2.5 A, 10 cycles at 3.75 A, and 5 cycles at 2.5 A.

FIG. 10 is a graph showing the charging and discharging capacities of Example 1 and Comparative Example 1. It can be seen that the decrease in capacity of the battery of Example 1 is lower than that of the battery of Comparative Example 1 as the number of cycles increases.

Referring to FIG. 10, the charging and discharging capacity showed a slightly better tendency in the case of Example 1. These differences are evident from Table 1 and the comparative graph of the energy efficiency of FIG. 11. At this time, FIG. 11 is a graph showing the energy efficiencies of Example 1 and Comparative Example 1.

TABLE 1

| Average energy efficiency at 2~10 cycles | | EE(%) |
|---|---|---|
| 50 mA/cm$^2$ | Comparative Example 1 | 79.0 |
| | Example 1 | 87.0 |
| 100 mA/cm$^2$ | Comparative Example 1 | 69.3 |
| | Example 1 | 80.2 |
| 150 mA/cm$^2$ | Comparative Example 1 | 56.5 |
| | Example 1 | 67.1 |

Referring to Table 1 and FIG. 11, it can clearly be seen that the insertion of fibrous conductive materials, carbon felt, increases the reaction area, and consequently reduces the resistance per unit area.

Therefore, it is very advantageous to introduce the structure of the present invention into a redox flow battery which targets high flow rate and high current density.

The redox flow battery of the present invention is preferably applicable as high performance battery having high flow rate and high current density.

DESCRIPTION OF SYMBOLS

11,15,21,25: bipolar plate
12,14,22,24: electrode layer
13,23: ion exchange membrane
27: flow path
1000: redox flow battery
100: battery module
101: unit module
111,113: end plate
115,117: collector plate
118,119: bipolar plate
120,121: electrode plate
123: ion exchange membrane plate
130: unit cell
151: fibrous conductive materials
152: body
154: partition wall
161: outlet
162: outlet
171: supply flow path
172: discharge flow path
181,182,183,184: connection member
202,204: electrolyte solution tank
302,304: electrolyte solution pump
F: flow path
A: reaction part of the electrolyte solution

The invention claimed is:

1. A unit cell for a redox flow battery comprising:
an ion exchange membrane;
electrode layers disposed respectively on both sides of the ion exchange membrane, which are at least one material selected from the group consisting of carbon felt, graphite felt, carbon cloth, carbon paper, metal cloth, metal felt, and foam metal; and
a bipolar plate disposed respectively on each side of the electrode layers opposite from the ion exchange membrane,
wherein the bipolar plate comprises partition wall structures in the bipolar plate that define an interdigitated flow path suitable for passage of electrolyte solution,
wherein the interdigitated flow path comprises fibrous conductive materials,
wherein the fibrous conductive materials have a porosity of 10% to 99% and a bulk density of 0.05 g/cm$^3$ to 0.2 g/cm$^3$,
wherein the fibrous conductive materials are filled at a volume ratio of 10% to 100% with respect to a flow path volume (flow path channel width*flow path channel depth*partition wall length),
and
wherein a depth X of the channel of the flow path relative to a filling thickness Y of the fibrous conductive materials before fixing inside the flow path by applying pressure satisfies the relation of formula $1<Y/X\leq2.5$.

2. The unit cell for the redox flow battery according to claim 1, wherein the fibrous conductive materials are in a form of at least one fabric selected from the group consisting of carbon felt, graphite felt, carbon cloth, carbon paper, metal cloth, and metal felt.

3. The unit cell for the redox flow battery according to claim 1, wherein the fibrous conductive materials further comprise at least one selected from the group consisting of carbon-based conductive materials and metal particles.

4. The unit cell for the redox flow battery according to claim 3, wherein the fibrous conductive materials comprise the carbon-based conductive materials, which include at least one selected from the group consisting of carbon paper, carbon fiber, carbon black, acetylene black, activated carbon, fullerene, carbon nanotube, carbon nanowire, carbon nano-horn and carbon nanoring.

5. The unit cell for the redox flow battery according to claim 3, wherein the fibrous conductive materials comprise the metal particles, which include at least one selected from the group consisting of Na, Al, Mg, Li, Ti, Zr, Cr, Mn, Co, Cu, Zn, Ru, Pd, Rd, Pt, Ag, Au, W, Ni and Fe.

6. The unit cell for the redox flow battery according to claim 1, wherein the electrode layers are formed by laminating one layer or two or more layers of carbon material, wherein the carbon material is selected from the group consisting of carbon felt, graphite felt, carbon cloth, and carbon paper.

7. The unit cell for the redox flow battery according to claim 1, wherein electrode layers are in a form where one or more layers of carbon material are laminated, wherein the carbon material is selected from the group consisting of carbon felt, graphite felt, carbon cloth, and carbon paper.

8. A redox flow battery comprising, a battery module formed by disposing unit modules on the sides of each other, which include unit stacks for generating electric currents, and electrically connecting them;

electrolyte solution tanks for supplying the electrolyte solution to the battery modules and storing the electrolyte solution flowing out of the modules; and electrolyte solution pumps for circulating the electrolyte solution between the module and the electrolyte solution tanks, wherein the unit stacks include a plurality of connected unit cells for the redox flow battery of claim 1.

* * * * *